April 12, 1960
W. R. WEEKS
2,932,715
ELECTRIC RANGE
Filed Nov. 24, 1958
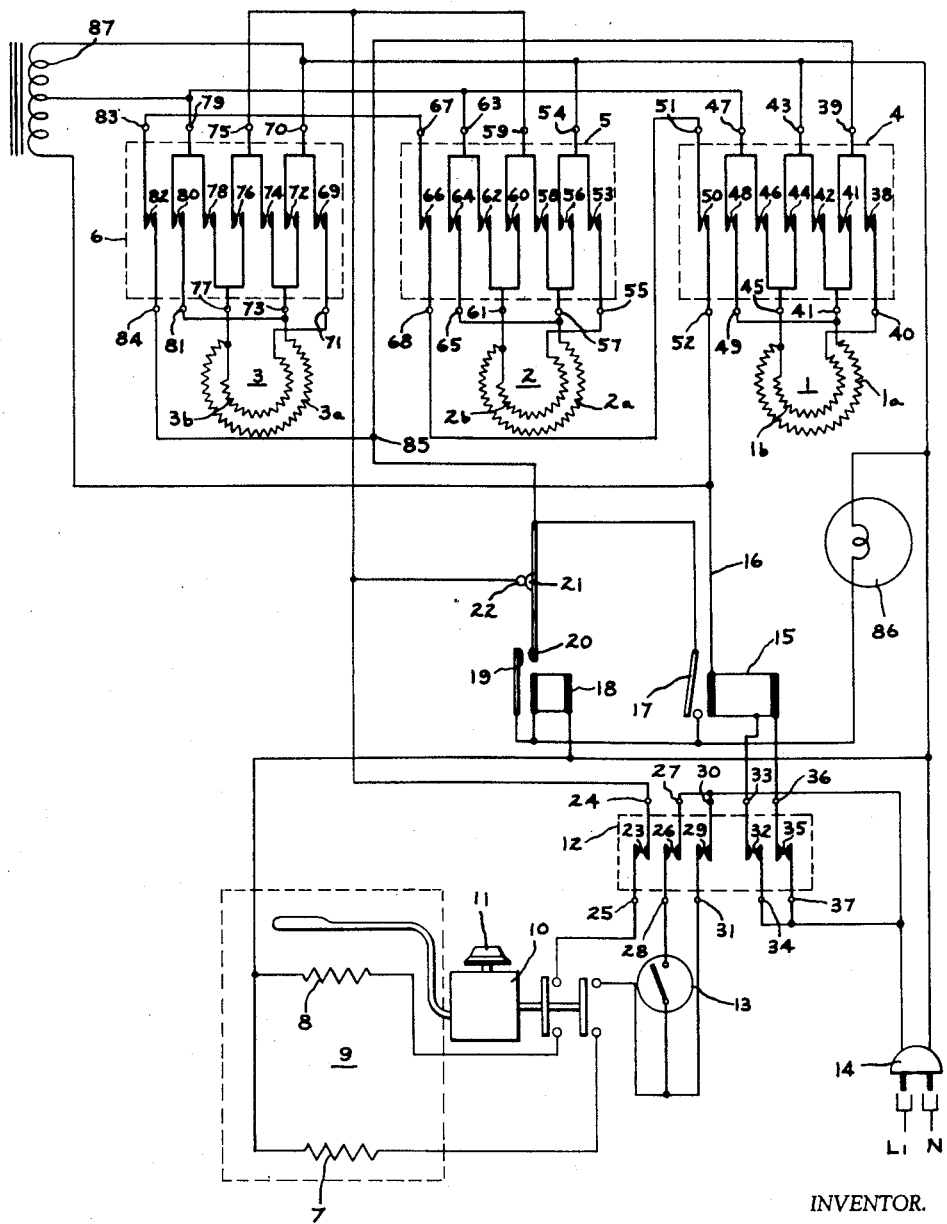
INVENTOR.
WALTER R. WEEKS
BY TG. Dysart
HIS ATTORNEY United States Patent Office 2,932,715
Patented Apr. 12, 1960

2,932,715

ELECTRIC RANGE

Walter R. Weeks, Windy Hills, Ky., assignor to General Electric Company, a corporation of New York Application November 24, 1958, Serial No. 775,768

9 Claims. (Cl. 219—20)

This invention relates to electric ranges, and more particularly to electric ranges of the type adapted to be energized from a two wire relatively low voltage household electric circuit rather than a three wire power circuit.

The general object of this invention is to provide an electric range of this character provided with both surface heating units and oven heating units so arranged and electrically interconnected that a wide variety of cooking operations may be performed when the range is plugged into an ordinary two wire household electrical circuit without exceeding the fuse rating of the circuit.

Further objects and advantages of the invention will become apparent as the following description proceeds, and the features of novelty which characterize the invention will be pointed out with particularity in the claims annexed to and forming a part of this specification.

Briefly stated, in accordance with one aspect of my invention I provide an electric range including three multiple-heat surface heating units, a pair of oven heating units arranged to supply heat for baking and broiling operations, a power circuit including an ordinary two wire electrical cord arranged to supply current to the range, a common conductor for supplying power to certain of the heating units, switching apparatus responsive to the current flowing in the common conductor for disconnecting the latter heating units whenever the current exceeds the fuse rating of the circuit, and means for conditioning the switching apparatus so as to respond to a current value lower than the fuse rating (by an amount equal to the current drawn by the oven "bake" unit) when the oven control switch is actuated to its bake position.

For a better understanding of this invention, reference may be made to the following description and the accompanying drawing in which the single figure is a circuit diagram showing an embodiment of the invention.

Referring to the drawing, the numerals 1, 2 and 3 designate surface heating units including resistance heating elements 1a, 1b; 2a, 2b; and 3a, 3b respectively. Surface heating units 1, 2 and 3 are of course arranged to be mounted on a horizontal cooktop so as to support and heat cooking utensils resting thereon, and are provided with heat output selector switches 4, 5 and 6 respectively. Each switch is arranged to connect the two heating elements of each heating unit either separately or in combination to an electrical circuit so as to provide a plurality of heat output levels. Switches 4, 5 and 6 may be of any suitable multi-contact type, but as will be pointed out below it is desirable that all, and necessary that at least one, of the pairs of contacts of each switch be opened momentarily when the switch is actuated from one heating position to another. Consequently a switch of the type disclosed in Patent 2,745,913, granted May 15, 1956, to Stanley B. Welch may be utilized. The range I have disclosed also includes an oven bake unit 7 and an oven broil unit 8 which are positioned adjacent the bottom and top respectively of an oven enclosure 9. Oven 9 is preferably equipped with an oven thermostat 10 (which may be of any suitable type, such as the bulb-and-bellows device illustrated) arranged to regulate energization of heating units 7 and 8 in accordance with the temperature in the oven and the setting of a manual temperature selector knob 11. Oven heating units 7 and 8 are also associated with an oven selector switch 12 and an oven time switch 13 arranged so that broil unit 8 may be energized alone, or bake unit 7 may be immediately energized, or its electrical circuit connected so that it is energized at a predetermined time in accordance with the setting of timer 13. Oven control switch 12 may be of any well known type, but is preferably of the type in which all contacts are opened each time the switch is actuated, and consequently a switch of the type disclosed in the aforementioned Welch patent may be utilized. Oven time switches are of course well known in the art, and need not be described herein.

Referring now to the power circuits by means of which surface heating units 1, 2 and 3 and oven heating units 7 and 8 are energized, it will be understood that the electric range of the present invention is intended for use on an ordinary two wire household electrical circuit, and consequently power is supplied to the range by means of an ordinary two prong plug; for convenience it will be assumed that the prongs of the plug are connected to lines L1 and the neutral line N of a power source energized at approximately 120 volts. Inasmuch as the maximum current carrying capacity of such a circuit is approximately 20 amperes and since the total current required to energize fully three surface heating units and two oven units far exceeds this capacity, it will be understood that it is necessary to limit the number of heating units that may be energized at any instant. For convenience in describing the present embodiment of this invention, definite numerical values for the wattage ratings of the various heating units will be specified, but it will be understood that such numerical values are for illustrative purposes only. Thus, heating unit 1 has a maximum wattage rating of 1,000 watts, heating unit 2 has a maximum wattage rating of 1,200 watts and heating unit 3 has a maximum wattage rating of 2,000 watts. Bake unit 7 is rated at 1,000 watts while broil unit 8 carries a rating of 2,400 watts, the latter figure being the maximum load that may be safely energized from a two wire 120 volt household circuit.

Heating units 1, 2 and 3 and broil unit 8 are supplied with current from line L1 through a circuit which includes a current relay 15 having a tapped coil selectively responsive to two different current levels. A common conductor 16 is in the circuit connecting the coil of relay 15 to these heating units, and it is the current in this conductor to which relay 15 responds so as to avoid overloading of the household electrical circuit. Movable contact 17 of relay 15 is normally in open circuit position, being pulled into closed circuit position only when the current flowing through the coil of the relay exceeds one of two preselected levels. When this occurs, movable contact 17 of the relay closes, energizing (by means of a circuit to be subsequently described) the coil of a holding relay 18. This in turn causes movable contact 19 not only to move into engagement with contact 20 so as to complete a holding circuit but also to move contact 21 out of engagement with contact 22 so as to de-energize the power circuit supplying heating units 2 and 3 and also the broil unit 8 (which may be called a "controlled" load circuit). In other words, if broil unit 8 is energized when any surface heating unit is energized the current responsive relay 15 functions to open the power circuit, and similarly if two or more surface heating units are energized in a combination totaling more than 2,400 watts the same function is performed by this switching device.

Referring now to the oven control portions of the present invention, oven control switch 12 is arranged to provide 4 different positions (off, broil, bake, and timed bake) and accordingly is provided with a pair of contacts 23 arranged to connect terminals 24 and 25, a pair of contacts 26 arranged to connect terminals 27 and 28, a pair of contacts 29 arranged to connect terminals 30 and 31, a pair of contacts 32 arranged to connect terminals 33 and 34 and a pair of contacts 35 arranged to connect terminals 36 and 37. In the off position of switch 12 all contacts are open except contacts 32; in the broil position all contacts are open except contacts 23 and 32, both pairs of which are closed; in the bake position only contacts 29 and 35 are closed; and in the time bake position only contacts 26 and 35 are closed. It will be observed that when switch 12 is in the off or broil position contacts 32 connect an intermediate portion of the coil of relay 15 to line L1 so that a relatively high current (20 amperes) is required to actuate the relay.

When oven switch 12 is in the bake or timed bake positions, however, contacts 35 are engaged and thus the entire coil of relay 15 is connected in the power circuit and consequently a lesser current (approximately 12 amperes in the present instance) is required to actuate the relay. Relay 15 is constructed and arranged so that the difference between this lesser current (12 amperes) and the rated current (20 amperes) of the circuit equals the current (8 amperes) drawn when bake unit 7 is energized; thus the current required to energize bake unit 7 is "reserved" whenever the oven selector switch is in the bake position. In other words, after oven switch 12 has been actuated to its bake or timed bake position, current responsive relay 15 will function to de-energize the controlled load power circuit if the total current drawn by energization of the surface units exceeds 12 amperes.

Referring now to the power circuits for energizing surface heating units 1, 2 and 3, it is first necessary to consider the arrangement and circuit connections of the control switches for these units. Control switch 4 includes a pair of contacts 38 arranged to connect terminals 39 and 40, a pair of contacts 41 arranged to connect terminals 39 and 41, a pair of contacts 42 arranged to connect terminals 43 and 41, a pair of contacts 44 arranged to connect terminals 43 and 45, a pair of contacts 46 arranged to connect terminals 47 and 45, a pair of contacts 48 arranged to connect terminals 47 and 49 and a pair of contacts 50 arranged to connect terminals 51 and 52. Similarly, switch 5 includes a pair of contacts 53 arranged to connect terminals 54 and 55, a pair of contacts 56 arranged to connect terminals 54 and 57, a pair of contacts 58 arranged to connect terminals 59 and 57, a pair of contacts 60 arranged to connect terminals 59 and 61, a pair of contacts 62 arranged to connect terminals 63 and 61, a pair of contacts 64 arranged to connect terminals 63 and 65 and a pair of contacts 66 arranged to connect terminals 67 and 68. Finally, control switch 6 includes a pair of contacts 69 arranged to connect terminals 70 and 71, a pair of contacts 72 arranged to connect terminals 70 and 73, a pair of contacts 74 arranged to connect terminals 75 and 73, a pair of contacts 76 arranged to connect termi-nals 75 and 77, a pair of contacts 78 arranged to connect terminals 79 and 77, a pair of contacts 80 arranged to connect terminals 79 and 81 and a pair of contacts 82 arranged to connect terminals 83 and 84.

In order to permit relay 18 to reset to its normal position (illustrated in the drawing) each time any control switch is actuated, the power circuit of the present invention is arranged so that current is supplied to common conductor 16 and the coil of relay 15 through either contacts 32 or contacts 35 of switch 12, and conductor 16 is connected to the various heating units by means of a circuit which includes contacts 50 of switch 4, contact 66 of switch 5, and contact 82 of switch 6. Thus junction 85 of the power circuit is supplied with power at line L1 voltage (less the negligible voltage drop across current relay 15) by means of a circuit which includes the aforementioned contacts. Junction 85 is connected directly to terminal 39 of switch 4 and the neutral line N of the power supply is connected directly to terminal 43 of this switch. Thus the heating circuits for energizing heating unit 1 may always be energized regardless of whether or not contact 17 of relay 15 has closed. In this connection it will be observed that a signal light 86 connected across the coil of relay 18 may be provided to visually indicate any overload condition, and that all power circuits except a half voltage circuit (to be described) and the circuits energizing heating unit 1 and bake unit 7 are open whenever relay 18 is energized. These latter two heating units have a total wattage of 2,000 watts, and consequently this total is insufficient to overload the main power circuit.

Bake unit 7 has been referred to as a "reserve" load, while heating units 2, 3 and 8 have been called "controlled" loads. Heating unit 1 may be properly referred to as a "preferred" load inasmuch as it is connected in the power circuit so as to remain energized regardless of the functioning of relays 15 and 18. The table below sets forth the various wattage outputs and the switch contacts which are closed to effect these outputs. Further, it will be understood that in order to provide five graduated heat levels a source of power at approximately one-half line voltage is required (for the two lowest heat levels). For this purpose an autotransformer 87 having a center tap connection so as to provide an output of approximately 60 volts may be connected directly to common conductor 16 and to the neutral line N so that it remains energized even though contacts 21 and 22 of relay 18 are open. Thus by connecting terminals 47, 63 and 79 of switches 4, 5 and 6 respectively to the center tap of autotransformer 87, 60 volt power may be supplied through these switches to the heating units. It will be observed that the "preferred" heating load mentioned above also includes, in addition to the entire output of heating unit 1, the low and warm heat outputs of heating units 2 and 3 inasmuch as these heat outputs may be obtained even though contacts 21 and 22 have been opened as a result of an overload condition.

*Switching and wattage table surface heating units*

| Switch Position | High | Second | Third | Low | Warm |
| --- | --- | --- | --- | --- | --- |
| Heating Unit 1: | | | | | |
| Contacts Closed | 38, 41, 44, 50 | 38, 44, 50 | 38, 42, 50 | 38, 46, (50) | 38, 48, (50) |
| Wattage | 1,000 | 500 | 250 | 125 | 62 |
| Heating Unit 2: | | | | | |
| Contacts Closed | 53, 56, 60, 66 | 53, 60, 66 | 53, 58, 66 | 53, 62, (66) | 53, 64, (66) |
| Wattage | 1,200 | 600 | 300 | 150 | 75 |
| Heating Unit 3: | | | | | |
| Contacts Closed | 69, 72, 76, 82 | 69, 76, 82 | 69, 74, 82 | 69, 78, (82) | 69, 80, (82) |
| Wattage | 2,000 | 1,000 | 500 | 250 | 125 |

From the foregoing it will be seen that I have provided a range control circuit which permits the energization of any combination of surface heating units and the oven bake unit so long as the total wattage does not exceed 2400 watts. Thus, for example, the oven bake unit may be energized together with heating unit 1 at full wattage and heating units 2 and 3 at low wattage to make possible four different and simultaneous cooking operations. Or again, surface heating units 1, 2 and 3 may each be energized on second heat without overloading the main power circuit. Many other combinations are of course possible. If, however, the housewife should choose a combination of heating circuits which exceeds 2,400 watts, current responsive relay 15 will close thus causing relay 18 to be actuated and thereby open contacts 21 and 22 so as to de-energize all heating circuits except the "preferred" circuits described above, namely the circuits providing power for heating unit 1, the low and warm heats of heating units 2 and 3, and the circuit for bake unit 7. At the same time, warning light 86 is energized to warn the housewife that an overload has occurred (it will of course be understood that a bell or buzzer, not shown, might be energized simultaneously with light 86). Finally, it will be seen that by means of the "reserved" load arrangement through which bake unit 7 is energized, it is impossible for the housewife to select a combination of heating loads which will subsequently result in an overload when the bake unit comes on for the first time as a result of the operation of timer 13 or thermostat 10.

While I have shown and described a particular embodiment of my invention, I do not desire the invention to be limited to the particular construction disclosed, and I intend by the appended claims to cover all modifications within the true spirit and scope of my invention.

What I claim is:

1. An electric range adapted to be energized from a two wire power source comprising a first heating unit, first switch means for controlling the energization of said first heating unit, a second heating unit, second switch means for controlling the energization of said second heating unit, a common conductor for supplying current to said heating units, the power supply circuit being opened during the transfer of any switch from one position to another and current responsive means in circuit with said conductor and responsive to the current flowing therein for disconnecting said second heating unit from said common conductor whenever said current exceeds a predetermined value, said means being restored to the former condition whenever the supply circuit is opened at another location in the circuit during a switching operation.

2. An electric range as defined in claim 1 in which said current responsive means includes a current relay connected so as to be actuated by current flowing in said common conductor and a holding relay arranged to be energized by said current relay, said holding relay including a pair of normally closed contacts in circuit with said second heating unit which are opened when said holding relay is energized.

3. An electric range adapted to be energized from a two wire power source comprising a first surface heating unit, first switch means for controlling the energization of said first heating unit, a second surface heating unit, second switch means for controlling the energization of said second heating unit, a common conductor for supplying current to said heating units, current responsive means in circuit with said conductor and responsive to the current flowing therein for disconnecting said second heating unit from said common conductor whenever said current exceeds a predetermined value, an oven heating unit, third switch means for connecting said oven heating unit to said power source, and means associated with said third switch means for conditioning said current responsive means so as to respond to a current value lower than said predetermined value by an amount equal to the current drawn by said oven heating unit so that there will always be enough current reserved for use by the oven heating unit during the operation of the two surface heating units.

4. An electric range as defined in claim 3 in which said current responsive means includes a current relay connected so as to be actuated by current flowing in said common conductor and a holding relay arranged to be energized by said current relay, said holding relay including a pair of contacts in circuit with said second heating unit which are opened when said holding relay is energized.

5. An electric range as defined in claim 3 including a second oven heating unit adapted for broiling operations, said second oven heating unit being connected in circuit with said common conductor and associated with said current responsive means so as to be deenergized thereby whenever the current in said conductor exceeds said predetermined value.

6. An electric range as defined in claim 2 in which said second switch means includes means for providing a plurality of varied heat outputs from said second heating unit and means for interrupting the flow of current in said common conductor each time said second switch means is actuated, whereby said holding relay is automatically reset.

7. An electric range as defined in claim 1 in which said second heating unit comprises a pair of resistance elements, said second switch means includes a plurality of pairs of switch contacts arranged to connect said resistance elements to said power source in various series, parallel and separate combinations so as to provide a plurality of heat output levels, and means energized from said power source for supplying a lower voltage than said power source voltage to said second switch means, said second switch means including at least one additional pair of contacts arranged to connect at least one of said resistance elements to said lower voltage supply.

8. An electric range adapted to be energized from a two wire power source comprising a first heating unit, first switch means for controlling the energization of said first heating unit, a second heating unit, said second heating unit comprising a pair of resistance elements, second switch means for controlling the energization of said second heating unit, an oven bake unit, an oven broil unit, third switch means having off, bake and broil positions for connecting said oven units to said power source, a common conductor for supplying current to all of said heating units except said oven bake unit, current responsive means in circuit with said conductor for disconnecting said second heating unit and said oven broil unit from said conductor whenever the current flowing therein exceeds a predetermined value, means associated with said third switch means and operative in the bake position thereof for conditioning said current responsive means so as to respond to a current value lower than said predetermined value by an amount equal to the current drawn by said oven bake unit, said second switch means including a plurality of pairs of switch contacts arranged to connect the resistance elements of said second heating unit to said power source in various series, parallel and separate combinations so as to provide a plurality of heat output levels.

9. An electric range adapted to be energized from a two wire power source comprising a first heating unit, first switch means for controlling the energization of said first heating unit, a second heating unit, said second heating unit comprising a pair of resistance elements, second switch means for controlling the energization of said second heating unit, an oven bake unit, an oven broil unit, third switch means having off, bake and broil positions for connecting said oven units to said power source, a common conductor for supplying current to all of said heating units except said oven bake unit, current responsive means in circuit with said conductor for disconnecting said second heating unit and said oven broil unit from said conductor whenever the current flowing therein exceeds a predetermined value, means associated with said third switch means and operative in the bake position thereof for conditioning said current responsive means so as to respond to a current value lower than said predetermined value by an amount equal to the current drawn by said oven bake unit, said second switch means including a plurality of pairs of switch contacts arranged to connect the resistance elements of said second heating unit to said power source in various series, parallel and separate combinations so as to provide a plurality of heat output levels, and an autotransformer directly connected to the power source and in circuit with the second switch means to supply a lower voltage than said power source voltage, said second switch means including at least one additional pair of contacts arranged to connect at least one of said resistance elements to said lower voltage supply.

References Cited in the file of this patent

UNITED STATES PATENTS

| | | |
|---|---|---|
| 1,306,542 | Hill | June 10, 1919 |
| 1,320,071 | Lehr | Oct. 28, 1919 |
| 1,954,147 | Shroyer | Apr. 10, 1934 |
| 2,279,525 | Rogers | Apr. 14, 1942 |
| 2,429,819 | Jordan | Oct. 28, 1947 |
| 2,900,480 | Jordan | Aug. 18, 1959 |